(12) United States Patent
Hayashi et al.

(10) Patent No.: US 11,600,854 B2
(45) Date of Patent: Mar. 7, 2023

(54) POSITIVE ELECTRODE MATERIAL INCLUDING POSITIVE ELECTRODE ACTIVE MATERIAL AND SOLID ELECTROLYTE AND BATTERY CONTAINING THE SAME

(71) Applicant: Panasonic Intellectual Property Management Co., Ltd., Osaka (JP)

(72) Inventors: Yohei Hayashi, Osaka (JP); Izuru Sasaki, Kyoto (JP); Yuta Sugimoto, Hyogo (JP)

(73) Assignee: PANASONIC INTRLLECTUAL PROPERTY MANAGEMENT CO., LTD., Osaka (JP)

( * ) Notice: Subject to any disclaimer, the term of this patent is extended or adjusted under 35 U.S.C. 154(b) by 258 days.

(21) Appl. No.: 16/911,442

(22) Filed: Jun. 25, 2020

(65) Prior Publication Data

US 2021/0005923 A1 Jan. 7, 2021

(30) Foreign Application Priority Data

Jul. 4, 2019 (JP) .............................. JP2019-125550

(51) Int. Cl.
*H01M 10/0562* (2010.01)
*H01M 10/0525* (2010.01)
(Continued)

(52) U.S. Cl.
CPC ....... *H01M 10/0562* (2013.01); *H01M 4/131* (2013.01); *H01M 4/134* (2013.01);
(Continued)

(58) Field of Classification Search
CPC .. H01M 10/0562; H01M 4/131; H01M 4/134; H01M 4/505; H01M 4/525;
(Continued)

(56) References Cited

U.S. PATENT DOCUMENTS

2012/0015234 A1* 1/2012 Iwaya ............... H01M 10/0585
429/152
2019/0088995 A1* 3/2019 Asano ..................... C01F 17/36

FOREIGN PATENT DOCUMENTS

| KR | 2018-0107058 A | * | 10/2018 | .......... H01M 10/052 |
| WO | 2018/025582 | | 2/2018 | |
| WO | WO2019135345 A1 | * | 7/2019 | .............. C01F 17/36 |

OTHER PUBLICATIONS

Machine translation of KR 2018-0107058A, Jung et al., 2018 (Year: 2018).*

(Continued)

*Primary Examiner* — Kwang Han
(74) *Attorney, Agent, or Firm* — McDermott Will & Emery LLP

(57) ABSTRACT

A positive electrode material contains a positive electrode active material and a first solid electrolyte material. The first solid electrolyte material is represented by Chemical Formula (1): $Li_\alpha M_\beta X_\gamma$. In Chemical Formula (1), $\alpha$, $\beta$, and $\gamma$ each represent a value larger than 0, M represents at least one element selected from the group consisting of metal elements other than lithium and of metalloid elements, and X represents at least one element selected from the group consisting of fluorine, chlorine, bromine, and iodine. The ratio of the volume of the positive electrode active material to the sum of the volume of the positive electrode active material and the volume of the solid electrolyte material is not less than 0.55 and not more than 0.85.

9 Claims, 1 Drawing Sheet

(51) Int. Cl.
*H01M 4/525* (2010.01)
*H01M 4/134* (2010.01)
*H01M 4/505* (2010.01)
*H01M 4/131* (2010.01)
*H01M 4/02* (2006.01)

(52) U.S. Cl.
CPC ........... *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ....... H01M 10/0525; H01M 2004/021; H01M 2004/028; H01M 2300/0068; H01M 2300/008; H01M 4/62; Y02E 60/10
See application file for complete search history.

(56) References Cited

OTHER PUBLICATIONS

Machine translation of WO2019135345A1, Asano et al., 2019 (Year: 2019).*

Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb—Lu, Y, Sc) Synthesis, Crystal Structures, and Ionic Motion", Journal of Inorganic and General Chemistry, Jul. 1997, vol. 623/Issue 7, pp. 1067-1073.

* cited by examiner

POSITIVE ELECTRODE MATERIAL INCLUDING POSITIVE ELECTRODE ACTIVE MATERIAL AND SOLID ELECTROLYTE AND BATTERY CONTAINING THE SAME

BACKGROUND

1. Technical Field

The present disclosure relates to a positive electrode material and a battery containing the positive electrode material.

2. Description of the Related Art

International Publication No. 2018/025582 discloses an all-solid-state battery containing a halide solid electrolyte.

SUMMARY

One non-limiting and exemplary embodiment provides a battery having high discharge capacity.

In one general aspect, the techniques disclosed here feature a positive electrode material containing a positive electrode active material and a first solid electrolyte material. The first solid electrolyte material is represented by Chemical Formula (1): $Li_\alpha M_\beta X_\gamma$. In Chemical Formula (1), $\alpha$, $\beta$, and $\gamma$ each represent a value larger than 0, M represents at least one element selected from the group consisting of metal elements other than lithium and of metalloid elements, and X represents at least one element selected from the group consisting of fluorine, chlorine, bromine, and iodine. The ratio of the volume of the positive electrode active material to the sum of the volume of the positive electrode active material and the volume of the solid electrolyte material is not less than 0.55 and not more than 0.85.

The present disclosure provides a battery having high discharge capacity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION OF THE EMBODIMENTS

Figure 1:
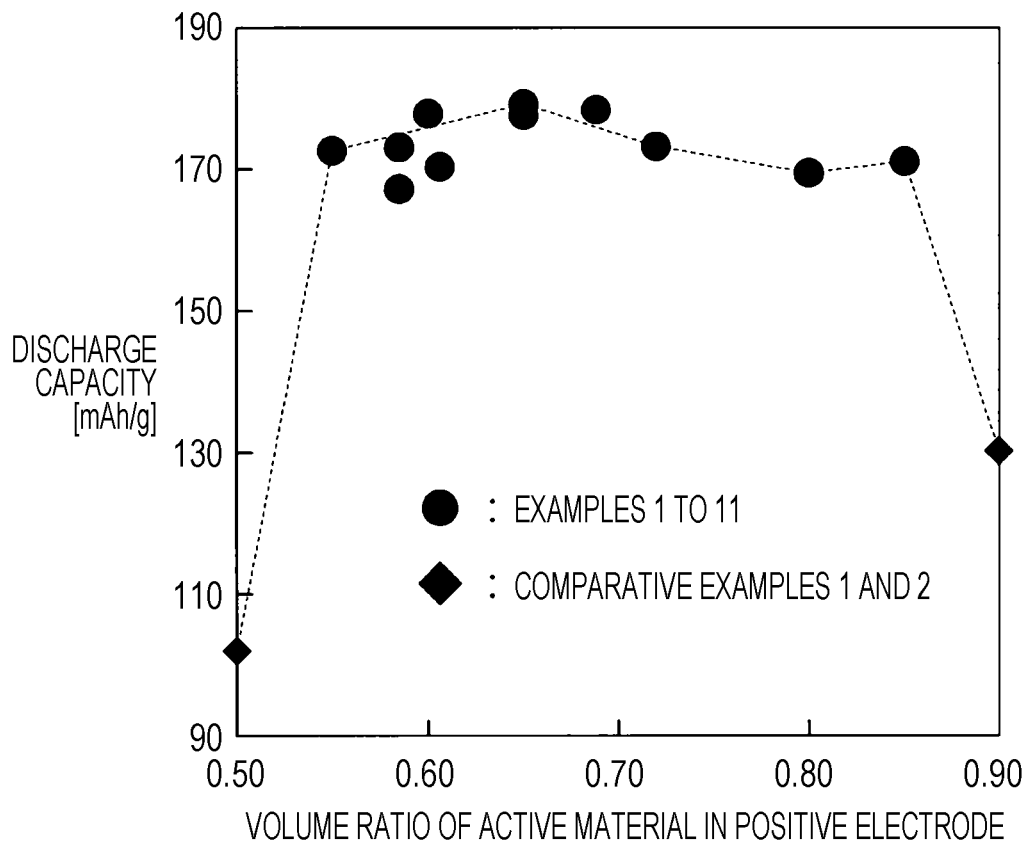
FIG. 1 is a graph illustrating the discharge capacity of secondary batteries of the inventive examples 1 to 11 and the comparative examples 1 and 2 with respect to each volume ratio of an active material in the positive electrode of the second batteries.

Hereafter, embodiments of the present disclosure will be described with reference to the drawings.

First Embodiment

A positive electrode material according to a first embodiment contains a positive electrode active material and a first solid electrolyte material.

The first solid electrolyte material is a material represented by Chemical Formula (1) below:

$$Li_\alpha M_\beta X_\gamma \qquad (1)$$

wherein $\alpha$, $\beta$, and $\gamma$ each represent a value larger than 0; M represents at least one element selected from the group consisting of metal elements other than lithium and of metalloid elements; and X represents at least one element selected from the group consisting of fluorine, chlorine, bromine, and iodine.

The ratio of the volume of the positive electrode active material to the sum of the volume of the positive electrode active material and the volume of the first solid electrolyte material is not less than 0.55 and not more than 0.85.

The positive electrode material according to the first embodiment is capable of improving the discharge capacity of a battery.

International Publication No. 2018/025582 discloses a battery containing a halide solid electrolyte. However, the literature does not mention the volume ratio of the halide solid electrolyte to the positive electrode active material in the positive electrode. In general, as the volume proportion of an active material contained in a positive electrode increases, active material particles come into contact with each other more easily, thereby improving electronic conductivity. As a result, the internal resistance of the battery is decreased, thereby improving the discharge capacity of the battery. Thus, as the volume ratio of an active material in a positive electrode increases, the discharge capacity of a battery is also anticipated to be improved.

As a result of studies, the inventors found that by adjusting the volume ratio of the positive electrode active material to the first solid electrolyte material (i.e., an example of a halide solid electrolyte) in the positive electrode as described above, the internal resistance of a battery is decreased and the discharge capacity of the battery is improved.

In the positive electrode, when the ratio of the volume of the positive electrode active material to the sum of the volume of the positive electrode active material and the volume of the first solid electrolyte material is less than 0.55, the battery has insufficient discharge capacity.

Because a halide solid electrolyte has high adhesion to the positive electrode active material, the surface of the positive electrode active material tends to be covered with the first solid electrolyte material having extremely small electronic conductivity. Thus, positive electrode active material particles are kept from being in contact with each other, thereby increasing the internal resistance of the battery.

In the positive electrode, when the ratio of the volume of the positive electrode active material to the sum of the volume of the positive electrode active material and the volume of the first solid electrolyte material is more than 0.85, the battery has insufficient discharge capacity.

Because the first solid electrolyte material is hard and less prone to deformation, the contact area between the first solid electrolyte material and the positive electrode active material can be small. Furthermore, because the volume proportion of the first solid electrolyte material in the positive electrode decreases, ionic conductivity is decreased. Because the decrease in ionic conductivity due to the increase in the positive electrode active material becomes more evident than the improvement in electronic conductivity due to the same factor, the internal resistance of the battery is expected to be increased. Here, "deformation" refers to elastic deformation or plastic deformation.

Examples of a solid electrolyte material include not only halide solid electrolytes such as the first solid electrolyte material, but also sulfide solid electrolytes and oxide solid electrolytes. Softness and adhesion to the positive electrode active material differ among solid electrolyte materials depending on the materials thereof.

A sulfide solid electrolyte and an oxide solid electrolyte have lower adhesion to the positive electrode active material than a halide solid electrolyte and are thus less likely to keep positive electrode active material particles from being in contact with each other. Furthermore, a sulfide solid electrolyte is softer than a halide solid electrolyte. Because sufficient contact areas between sulfide solid electrolyte particles and the positive electrode active material particles and between the sulfide solid electrolyte particles are thus provided, ionic conductivity is less likely to be decreased.

In the case where the positive electrode contains a halide solid electrolyte, when the volume ratio of the positive electrode active material to the halide solid electrolyte is adjusted as described above, sufficient contact areas between positive electrode active material particles, between halide solid electrolyte particles, and between the positive electrode active material particles and the halide solid electrolyte particles are expected to be provided.

To further increase the discharge capacity of the battery, in the positive electrode material, the ratio of the volume of the positive electrode active material Vpa to the sum of the volume of the positive electrode active material Vpa and the volume of the first solid electrolyte material Vpe may be not less than 0.60 and not more than 0.72, preferably not less than 0.65 and not more than 0.72. That is, $0.60 \leq Vpa/(Vpa+Vpe) \leq 0.72$ or $0.65 \leq Vpa/(Vpa+Vpe) \leq 0.72$ may be satisfied.

In the present disclosure, the term "metalloid elements" refers to B, Si, Ge, As, Sb, and Te.

In the present disclosure, the term "metal elements" refers to: (i) all the group 1 to group 12 elements (other than hydrogen) of the periodic table; and (ii) all the group 13 to group 16 elements (other than B, Si, Ge, As, Sb, Te, C, N, P, O, S, and Se) of the periodic table.

To improve the ionic conductivity of the first solid electrolyte material, in Chemical Formula (1), M may include yttrium (Y). That is, the first solid electrolyte material may contain Y as a metal element. As a result of the improvement in the ionic conductivity, the internal resistance of the battery can be decreased and the discharge capacity of the battery can be improved.

The first solid electrolyte material containing Y may be, for example, a compound represented by the chemical formula $Li_aMe_bY_cX_6$, for which $a+mb+3c=6$ and $c>0$ are satisfied. Here, Me represents at least one element selected from the group consisting of metal elements other than Li and Y and of metalloid elements, and m represents the valence of Me.

Furthermore, Me may be at least one element selected from the group consisting of Mg, Ca, Sr, Ba, Zn, Sc, Al, Ga, Bi, Zr, Hf, Ti, Sn, Ta, and Nb.

To improve the ionic conductivity of the first solid electrolyte material, in Chemical Formula (1), M may include zirconium (Zr). That is, the first solid electrolyte material may contain Zr as a metal element. As a result of the improvement in the ionic conductivity, the internal resistance of the battery can be decreased and the discharge capacity of the battery can be improved.

The first solid electrolyte material containing Zr may be, for example, a compound represented by the chemical formula $Li_pMe'_qZr_rX_6$, for which $p+m'q+4r=6$ and $c>0$ are satisfied. Here, Me' represents at least one element selected from the group consisting of metal elements other than Li, Y, and Zr and of metalloid elements, and m' represents the valence of Me'.

Furthermore, Me' may be at least one element selected from the group consisting of Mg, Ca, Sr, Ba, Zn, Sc, Al, Ga, Bi, Hf, Ti, Sn, Ta, and Nb.

To improve the ionic conductivity of the first solid electrolyte material, in Chemical Formula (1), $2.5 \leq \alpha \leq 3$, $\beta=1$, and $\gamma=6$ may be satisfied. As a result of the improvement in the ionic conductivity, the battery can have high discharge capacity.

To improve the potential stability of the first solid electrolyte material and the discharge capacity of the battery, in Chemical Formula (1), X may include chlorine (Cl).

To improve the ionic conductivity of the first solid electrolyte material, in Chemical Formula (1), X may include bromine (Br).

To improve the ionic conductivity of the first solid electrolyte material, in Chemical Formula (1), X may include iodine (I).

The first solid electrolyte material may be a material represented by Chemical Formula (A1) below:

$$Li_{6-3d}Y_dX_6 \qquad (A1)$$

wherein X represents two or more elements selected from the group consisting of F, Cl, Br, and I; and $0<d<2$ is satisfied.

The material represented by Chemical Formula (A1) has high ionic conductivity, which helps to further improve the discharge capacity of the battery.

The first solid electrolyte material may be a material represented by Chemical Formula (A2) below:

$$Li_{3-3\delta}Y_{1+\delta}Cl_6 \qquad (A2)$$

wherein $0<\delta \leq 0.15$ is satisfied.

The material represented by Chemical Formula (A2) has high ionic conductivity, which helps to further improve the discharge capacity of the battery.

The first solid electrolyte material may be a material represented by Chemical Formula (A3) below:

$$Li_{3-3\delta}Y_{1+\delta}Br_6 \qquad (A3)$$

wherein $0<\gamma \leq 0.25$ is satisfied.

The material represented by Chemical Formula (A3) has high ionic conductivity, which helps to further improve the discharge capacity of the battery.

The first solid electrolyte material may be a material represented by Chemical Formula (A4) below:

$$Li_{3-3\delta+a}Y_{1+\delta-a}Me_aCl_{6-x-y}Br_xI_y \qquad (A4)$$

wherein Me represents at least one element selected from the group consisting of Mg, Ca, Sr, Ba, and Zn; and $-1<\delta<2$, $0<a<3$, $0<(3-3\delta+a)$, $0<(1+\delta-a)$, $0 \leq x \leq 6$, $0 \leq y \leq 6$, and $(x+y) \leq 6$ are satisfied.

The material represented by Chemical Formula (A4) has high ionic conductivity, which helps to further improve the discharge capacity of the battery.

The first solid electrolyte material may be a material represented by Chemical Formula (A5) below:

$$Li_{3-3\delta}Y_{1+\delta-a}Me_aCl_{6-x-y}Br_xI_y \quad (A5)$$

wherein Me represents at least one element selected from the group consisting of Al, Sc, Ga, and Bi; and $-1<\delta<1$, $0<a<2$, $0<(1+\delta-a)$, $0\leq x\leq 6$, $0\leq y\leq 6$, and $(x+y)\leq 6$ are satisfied.

The material represented by Chemical Formula (A5) has high ionic conductivity, which helps to further improve the discharge capacity of the battery.

The first solid electrolyte material may be a material represented by Chemical Formula (A6) below:

$$Li_{3-3\delta-a}Y_{1+6-a}Me_aCl_{6-x-y}Br_xI_y \quad (A6)$$

wherein Me represents at least one element selected from the group consisting of Zr, Hf, and Ti; and $-1<\delta<1$, $0<a<1.5$, $0<(3-3\delta-a)$, $0<(1+\delta-a)$, $0\leq x\leq 6$, $0\leq y\leq 6$, and $(x+y)\leq 6$ are satisfied.

The material represented by Chemical Formula (A6) has high ionic conductivity, which helps to further improve the discharge capacity of the battery.

The first solid electrolyte material may be a material represented by Chemical Formula (A7) below:

$$Li_{3-3\delta-2a}Y_{1+\delta-a}Me_aCl_{6-x-y}Br_xI_y \quad (A7)$$

wherein Me represents at least one element selected from the group consisting of Ta and Nb; and $-1<\delta<1$, $0<a<1.2$, $0<(3-3\delta-2a)$, $0<(1+\delta-a)$, $0\leq x\leq 6$, $0\leq y\leq 6$, and $(x+y)\leq 6$ are satisfied.

The material represented by Chemical Formula (A7) has high ionic conductivity, which helps to further improve the discharge capacity of the battery.

As the first solid electrolyte material, for example, $Li_3YX_6$, $Li_2MgX_4$, $Li_2FeX_4$, $Li(Al,Ga,In)X_4$, or $Li_3(Al,Ga,In)X_6$ may be used. As used herein, "(Al,Ga,In)" refers to at least one element selected from the group consisting of Al, Ga, and In.

The positive electrode active material is a material capable of storing and releasing metal ions (e.g., lithium ions).

Examples of the positive electrode active material include lithium transition metal oxides (e.g., $Li(NiCoAl)O_2$, $Li(NiCoMn)O_2$, and $LiCoO_2$), transition metal fluorides, polyanions, fluoride polyanion materials, transition metal sulfides, transition metal oxysulfides, and transition metal oxynitrides. When a lithium transition metal oxide is used as the positive electrode active material, the manufacturing costs can be decreased and the average discharge voltage of the battery can be improved.

To improve the discharge capacity and energy density of the battery, the positive electrode active material may be a lithium nickel manganese cobalt oxide. The lithium nickel manganese cobalt oxide may be $Li(NiCoMn)O_2$.

To improve the discharge capacity and energy density of the battery, the positive electrode active material may be a lithium nickel cobalt aluminum oxide. The lithium nickel cobalt aluminum oxide may be $Li(NiCoAl)O_2$.

To improve the charge-discharge efficiency of the battery, at least a portion of the surface of the positive electrode active material may be coated with a coating material.

A material having low electronic conductivity can be used as the coating material. Examples of the coating material include oxide materials and oxide solid electrolyte materials.

Examples of the oxide materials include $SiO_2$, $Al_2O_3$, $TiO_2$, $B_2O_3$, $Nb_2O_5$, $WO_3$, and $ZrO_2$. Examples of the oxide solid electrolyte materials include Li—Nb—O compounds such as $LiNbO_3$, Li—B—O compounds such as $LiBO_2$ and $Li_3BO_3$, Li—Al—O compounds such as $LiAlO_2$, Li—Si—O compounds such as $Li_4SiO_4$, Li—S—O compounds such as $Li_2SO_4$, Li—Ti—O compounds such as $Li_4Ti_5O_{12}$, Li—Zr—O compounds such as $Li_2ZrO_3$, Li—Mo—O compounds such as $Li_2MoO_3$, Li-V-O compounds such as $LiV_2O_5$, and Li—W—O compounds such as $Li_2WO_4$.

In view of ionic conductivity and potential stability, the coating material may be an oxide solid electrolyte. By using an oxide solid electrolyte for the coating material, the charge-discharge efficiency of the battery can further be improved.

The oxide solid electrolyte material used as the coating material may be lithium niobate ($LiNbO_3$). Lithium niobate has high ionic conductivity and high potential stability.

When the surface of the positive electrode active material is coated with the coating material, the positive electrode active material and the first solid electrolyte material are interposed by the coating material and do not come into contact with each other. A coating layer containing the coating material may have a thickness of not less than 1 nm and not more than 100 nm. When the coating layer has a thickness of not less than 1 nm, the positive electrode active material and the first solid electrolyte material are suppressed from being in contact with each other, which helps to suppress a side reaction of the first solid electrolyte material. As a result, the charge-discharge efficiency of the battery can be improved. When the coating layer has a thickness of not more than 100 nm, the internal resistance of the battery can be sufficiently small. Thus, the discharge capacity of the battery can be improved.

To improve the output of the battery, a portion of the surface of the positive electrode active material may be coated. As a result of positive electrode active material particles coming in contact with each other via a portion without the coating layer, the electronic conductivity between the positive electrode active material particles are improved.

To improve the charge-discharge efficiency of the battery, the entire surface of the positive electrode active material may be coated with the coating material. As a result of the positive electrode active material and the first solid electrolyte material being suppressed from being in contact with each other, a side reaction of the first solid electrolyte material can be suppressed.

The form of the first solid electrolyte material is not limited. The first solid electrolyte material may be in the form of, for example, a needle, a sphere, or an ellipsoid. The first solid electrolyte material may also be in the form of particles.

When the first solid electrolyte material is in the form of particles (e.g., spherical particles), first solid electrolyte particles may have a median diameter of not more than 100 µm, preferably not more than 10 µm, in which case the positive electrode active material and the first solid electrolyte particles can be well dispersed in the positive electrode material. As a result, the charge-discharge characteristics of the battery can be improved.

The first solid electrolyte particles may have a median diameter smaller than the median diameter of the positive electrode active material, in which case the first solid electrolyte particles and the positive electrode active material can be well dispersed in the positive electrode material. As a result, the charge-discharge characteristics of the battery can be improved.

The positive electrode active material may have a median diameter of not less than 0.1 µm and not more than 100 µm. When the positive electrode active material has a median diameter of not less than 0.1 µm, the positive electrode active material and the first solid electrolyte particles can be well dispersed in the positive electrode material. As a result, the charge-discharge characteristics of the battery can be improved. When the positive electrode active material has a median diameter of not more than 100 µm, the diffusion rate of lithium in the positive electrode active material is improved. Thus, the battery can operate with a high output.

(Method for Manufacturing First Solid Electrolyte Material)

The first solid electrolyte material according to the first embodiment can be manufactured, for example, through the following method.

Halide raw material powders are prepared considering the composition of the product. For example, when $Li_3YCl_6$ is produced, LiCl and $YCl_3$ are prepared in a molar ratio of 3:1.

The elements represented by M, Me, Me', and X in the above-described chemical formulas are determined by selecting the kind of raw material powders. The values represented by α, β, γ, a, b, c, and d are determined by adjusting the raw material powders, the combination ratio thereof, and the synthesis process therefor.

Raw material powders are mixed to obtain a mixed powder. Particles of the mixed powder are caused to mechanochemically (i.e., through a method of mechanochemical milling treatment) react with each other in a mixing apparatus such as a planetary ball mill to obtain a reactant. The reactant may be fired in a vacuum or an inert atmosphere. Alternatively, the mixed powder may be fired in a vacuum or an inert atmosphere to obtain a reactant.

The first solid electrolyte material can be obtained through the above-described method.

Second Embodiment

Hereafter, a second embodiment will be described. Descriptions overlapping those of the first embodiment will be omitted where appropriate.

A battery according to the second embodiment includes a positive electrode, a negative electrode, and an electrolyte layer. The positive electrode contains the positive electrode material according to the first embodiment. The electrolyte layer is disposed between the positive electrode and the negative electrode. The electrolyte layer contains a second solid electrolyte material. The battery according to the second embodiment has high discharge capacity.

Figure 2:
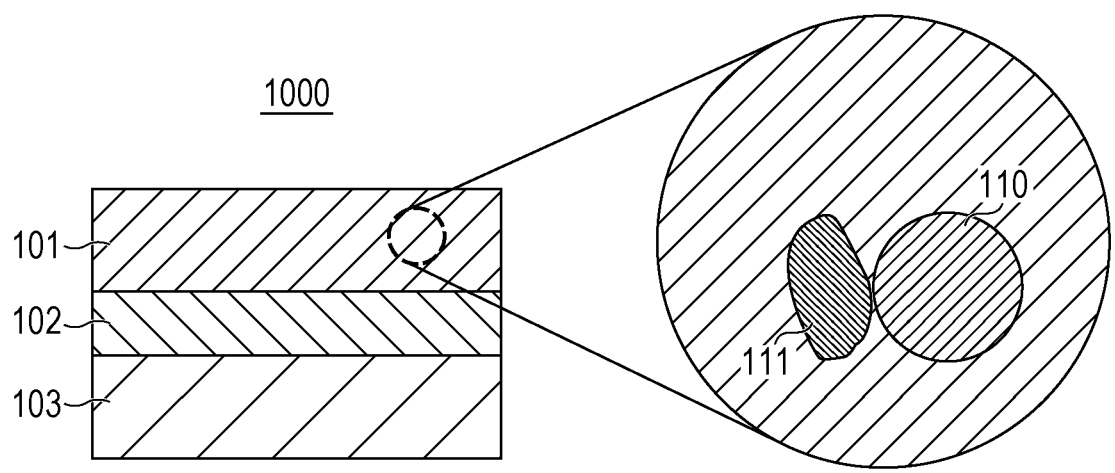
FIG. 2 is a sectional view of a battery according to a second embodiment.

FIG. 2 is a sectional view of a battery 1000 according to the second embodiment. The battery 1000 includes a positive electrode 101, an electrolyte layer 102, and a negative electrode 103. The positive electrode 101 includes a first solid electrolyte particle 110 and a positive electrode active material particle 111. The electrolyte layer 102 is disposed between the positive electrode 101 and the negative electrode 103. The electrolyte layer 102 contains the second solid electrolyte material.

In view of the energy density and output of the battery, the positive electrode 101 may have a thickness of not less than 10 µm and not more than 500 µm.

To improve the discharge capacity of the battery, the second solid electrolyte material may be a halide solid electrolyte.

The halide solid electrolyte may be a compound exemplified as the first solid electrolyte material in the first embodiment. The second solid electrolyte material may be a material that is the same as or different from the first solid electrolyte material.

The second solid electrolyte material may be a sulfide solid electrolyte. The use of a sulfide solid electrolyte having good reduction stability enables the use of a low-potential negative electrode material. As a result, the energy density of the battery can be improved.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Furthermore, LiX, $Li_2O$, MO, or $Li_pMO_q$ may be added to the foregoing. Here, M represents at least one element selected from the group consisting of P, Si, Ge, B, Al, Ga, In, Fe, and Zn, p and q each represent a natural number, and X represents at least one element selected from the group consisting of F, Cl, Br, and I.

The second solid electrolyte material may be an oxide solid electrolyte.

Examples of the oxide solid electrolyte include: (i) NASICON solid electrolytes such as $LiTi_2(PO_4)_3$ and its element-substituted derivatives; (ii) (LaLi)$TiO_3$-based perovskite solid electrolytes; (iii) LISICON solid electrolytes such as $Li_{14}ZnGe_4O_{16}$, $Li_4SiO_4$, $LiGeO_4$, and their element-substituted derivatives; (iv) garnet solid electrolytes such as $Li_7La_3Zr_2O_{12}$ and its element-substituted derivatives; (v) $Li_3PO_4$ and its N-substituted derivatives; and (vi) glass or glass ceramics formed by adding $Li_2SO_4$ or $Li_2CO_3$ to a Li—B—O compound such as $LiBO_2$ or $Li_3BO_3$.

The second solid electrolyte material may be a polymer solid electrolyte.

Examples of the polymer solid electrolyte include polymer compounds and lithium salt compounds. The polymer compounds may have an ethylene oxide structure. A polymer solid electrolyte having an ethylene oxide structure is capable of containing a large amount of lithium salt, which helps to further improve ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from the foregoing may be used alone. Alternatively, mixtures of two or more lithium salts selected from the foregoing may be used.

The second solid electrolyte material may be a complex hydride solid electrolyte.

Examples of the complex hydride solid electrolyte include $LiBH_4$—$LiI$ and $LiBH_4$—$P_2S_5$.

The electrolyte layer 102 may be formed of only one of or two or more of the materials exemplified as the second solid electrolyte material. For example, the electrolyte layer 102 may contain a halide solid electrolyte material and a sulfide solid electrolyte material.

When the electrolyte layer 102 is formed of two or more materials, the materials may be uniformly dispersed. Alternatively, a plurality of layers each formed of a single material may be stacked in the stacking direction of the battery.

In view of suppressing a short circuit between the positive electrode 101 and the negative electrode 103 and of the output of the battery, the electrolyte layer 102 may have a thickness of not less than 1 μm and not more than 300 μm.

The negative electrode 103 contains a material capable of storing and releasing metal ions (e.g., lithium ions). An example of the material is a negative electrode active material.

Examples of the negative electrode active material include metal materials, carbon materials, oxides, nitrides, tin compounds, and silicon compounds. The metal materials may be elemental metals or alloys. Examples of the metal materials include lithium metal and lithium alloys. Examples of the carbon materials include natural graphite, coke, carbons undergoing graphitization, carbon fibers, spherical carbons, artificial graphite, and amorphous carbons. In view of capacity density, silicon (Si), tin (Sn), a silicon compound, or a tin compound may be used as a negative electrode active material.

The negative electrode 103 may contain a solid electrolyte material, in which case the lithium ionic conductivity in the negative electrode 103 is improved. As a result, the battery can operate with a high output. The solid electrolyte material may be a material exemplified as the second solid electrolyte material.

The negative electrode active material may have a median diameter of not less than 0.1 μm and not more than 100 μm. When the negative electrode active material has a median diameter of not less than 0.1 μm, the negative electrode active material and the solid electrolyte material can be well dispersed in the negative electrode 103. As a result, the charge-discharge characteristics of the battery can be improved. When the negative electrode active material has a median diameter of not more than 100 μm, the diffusion rate of lithium in the negative electrode active material is improved. Thus, the battery can operate with a high output.

The negative electrode active material may have a median diameter larger than the median diameter of the solid electrolyte material, in which case the negative electrode active material and the solid electrolyte material can be well dispersed.

In view of the energy density and output of the battery, in the negative electrode 103, the ratio of the volume of the negative electrode active material to the sum of the volume of the negative electrode active material and the volume of the solid electrolyte material may be not less than 0.30 and not more than 0.95.

In view of the energy density and output of the battery, the negative electrode 103 may have a thickness of not less than 10 μm and not more than 500 μm.

At least one selected from the group consisting of the positive electrode 101, the electrolyte layer 102, and the negative electrode 103 may contain a binder to improve the adhesion between particles.

Examples of the binder include polyvinylidene fluoride, polytetrafluoroethylene, polyethylene, polypropylene, aramid resin, polyamide, polyimide, polyamide-imide, polyacrylonitrile, polyacrylic acid, methyl polyacrylate esterne, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene-butadiene rubber, and carboxymethyl cellulose. Copolymers can also be used as the binder. Examples of such a binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

A mixture of two or more selected from the above-described materials may also be used as the binder.

At least one selected from the positive electrode 101 and the negative electrode 103 may contain a conductive agent to improve electronic conductivity.

Examples of the conductive agent include: (i) graphites such as natural graphite and artificial graphite; (ii) carbon blacks such as acetylene black and Ketjen black; (iii) conductive fibers such as carbon fibers and metal fibers; (iv) fluorinated carbons; (v) metal powders such as aluminum powder; (vi) conductive whiskers such as zinc oxide whiskers and potassium titanate whiskers; (vii) conductive metal oxides such as titanium oxides; and (viii) conductive polymer compounds such as polyaniline, polypyrrole, and polythiophene. To achieve low costs, the foregoing conductive agents (i) and (ii) can be used.

The form of the battery according to the second embodiment is, for example, coin-like, cylindrical, square, sheet-like, button-like, flat, or stacked.

EXAMPLES

The present disclosure will be described in further detail with reference to Examples.

Inventive Example 1

(Production of First Solid Electrolyte Material)

In an argon atmosphere of a dew point of −60° C. or less (hereafter referred to as a "dry argon atmosphere"), LiBr, LiCl, $YCl_3$, and $YBr_3$ were prepared as raw material powders so as to have a molar ratio of LiBr:LiCl:$YCl_3$:$YBr_3$=1:5:1:1. The mixture of the raw material powders was treated with a planetary ball mill (P-7, manufactured by Fritsch, Inc.) for 25 hours at 600 rpm to cause the raw material powders to mechanochemically react. In this way, a powder of a first solid electrolyte material of the inventive example 1 was obtained. The first solid electrolyte material of the inventive example 1 had a composition represented by $Li_3YBr_2Cl_4$.

(Production of Positive Electrode Material)

In a dry argon atmosphere, a powder of $Li(NiCoMn)O_2$ (hereafter referred to as "NCM"), which is a positive electrode active material, and a powder of the first solid electrolyte material of the inventive example 1 were prepared so as to have a volume ratio of 85:15. The materials were mixed in an agate mortar. In this way, a positive electrode material of the inventive example 1 was obtained.

Inventive Example 2

(Production of Positive Electrode Material)

In a dry argon atmosphere, a powder of NCM and a powder of the first solid electrolyte material of the inventive example 1 were prepared so as to have a volume ratio of 80:20. Except for this, the same procedure was performed as in the inventive example 1 to obtain a positive electrode material of the inventive example 2.

Inventive Example 3

(Production of Positive Electrode Material)

In a dry argon atmosphere, a powder of NCM and a powder of the first solid electrolyte material of the inventive example 1 were prepared so as to have a volume ratio of 72:28. Except for this, the same procedure was performed as in the inventive example 1 to obtain a positive electrode material of the inventive example 3.

Inventive Example 4

(Production of Positive Electrode Material)

In a dry argon atmosphere, a powder of NCM and a powder of the first solid electrolyte material of the inventive example 1 were prepared so as to have a volume ratio of 65:35. Except for this, the same procedure was performed as in the inventive example 1 to obtain a positive electrode material of the inventive example 4.

Inventive Example 5

(Production of Positive Electrode Material)

In a dry argon atmosphere, a powder of NCM and a powder of the first solid electrolyte material of the inventive example 1 were prepared so as to have a volume ratio of 55:45. Except for this, the same procedure was performed as in the inventive example 1 to obtain a positive electrode material of the inventive example 5.

Inventive Example 6

(Production of First Solid Electrolyte Material)

In a dry argon atmosphere, LiBr, LiCl, $YCl_3$, and $YBr_3$ were prepared as raw material powders to achieve a molar ratio of $LiBr:LiCl:YCl_3:YBr_3=3:3:1:1$. Except for this, the same procedure was performed as in the inventive example 1 to obtain a first solid electrolyte material of the inventive example 6. The first solid electrolyte material of the inventive example 6 had a composition represented by $Li_3YBr_3Cl_3$.

(Production of Positive Electrode Material)

In a dry argon atmosphere, a powder of NCM and a powder of the first solid electrolyte material of the inventive example 6 were prepared so as to have a volume ratio of 60.6:39.4. Except for this, the same procedure was performed as in the inventive example 1 to obtain a positive electrode material of the inventive example 6.

Inventive Example 7

(Production of First Solid Electrolyte Material) In a dry argon atmosphere, LiCl and $YCl_3$ were prepared as raw material powders so as to have a molar ratio of $LiCl:YCl_3=3:1$. Except for this, the same procedure was performed as in the inventive example 1 to obtain a first solid electrolyte material of the inventive example 7. The first solid electrolyte material of the inventive example 7 had a composition represented by $Li_3YCl_6$.

(Production of Positive Electrode Material)

In a dry argon atmosphere, a powder of NCM and a powder of the first solid electrolyte material of the inventive example 7 were prepared so as to have a volume ratio of 58.5:41.5. Except for this, the same procedure was performed as in the inventive example 1 to obtain a positive electrode material of the inventive example 7.

Inventive Example 8

(Production of First Solid Electrolyte Material)

In a dry argon atmosphere, LiBr and $YBr_3$ were prepared as raw material powders so as to have a molar ratio of $LiBr:YBr_3=3:1$. Except for this, the same procedure was performed as in the inventive example 1 to obtain a first solid electrolyte material of the inventive example 8. The first solid electrolyte material of the inventive example 8 had a composition represented by $Li_3YBr_6$.

(Production of Positive Electrode Material)

In a dry argon atmosphere, a powder of NCM and a powder of the first solid electrolyte material of the inventive example 8 were prepared so as to have a volume ratio of 68.8:31.2. Except for this, the same procedure was performed as in the inventive example 1 to obtain a positive electrode material of the inventive example 8.

Inventive Example 9

(Production of First Solid Electrolyte Material)

In a dry argon atmosphere, LiCl, $ZrCl_4$, and $YCl_3$ were prepared as raw material powders so as to have a molar ratio of $LiCl:ZrCl_4:YCl_3=5:1:1$. Except for this, the same procedure was performed as in the inventive example 1 to obtain a first solid electrolyte material of the inventive example 9. The first solid electrolyte material of the inventive example 9 had a composition represented by $Li_{2.5}Zr_{0.5}Y_{0.5}Cl_6$.

(Production of Positive Electrode Material)

In a dry argon atmosphere, a powder of NCM and a powder of the first solid electrolyte material of the inventive example 9 were prepared so as to have a volume ratio of 65:35. Except for this, the same procedure was performed as in the inventive example 1 to obtain a positive electrode material of the inventive example 9.

Inventive Example 10

(Production of Positive Electrode Material)

In a dry argon atmosphere, a powder of NCM and a powder of the first solid electrolyte material of the inventive example 9 were prepared in a volume ratio of 60:40. Except for this, the same procedure was performed as in the inventive example 1 to obtain a positive electrode material of the inventive example 10.

Inventive Example 11

(Production of First Solid Electrolyte Material)

In a dry argon atmosphere, LiCl and $YCl_3$ were prepared as raw material powders so as to have a molar ratio of $LiCl:YCl_3=3:1$. Except for this, the same procedure was performed as in the inventive example 1 to obtain a first solid electrolyte material of the inventive example 11. The first solid electrolyte material of the inventive example 11 had a composition represented by $Li_3YCl_6$.

(Production of Positive Electrode Material)

In a dry argon atmosphere, $Li(NiCoAl)O_2$ (hereafter referred to as "NCA"), which is a positive electrode active material, and the first solid electrolyte material of the inventive example 11 were prepared so as to have a volume ratio of 58.5:41.5. Except for this, the same procedure was performed as in the inventive example 1 to obtain a positive electrode material of the inventive example 11.

Comparative Example 1

(Production of Positive Electrode Material)

In a dry argon atmosphere, a powder of NCM and a powder of the first solid electrolyte material of the inventive example 1 were prepared so as to have a volume ratio of 90:10. Except for this, the same procedure was performed as in the inventive example 1 to obtain a positive electrode material of the comparative example 1.

Comparative Example 2

(Production of Positive Electrode Material)

In a dry argon atmosphere, a powder of NCM and a powder of the first solid electrolyte material of the inventive example 1 were prepared so as to have a volume ratio of 50:50. Except for this, the same procedure was performed as in the inventive example 1 to obtain a positive electrode material of the comparative example 2.

(Production of Sulfide Solid Electrolyte)

In a dry argon atmosphere, $Li_2S$ and $P_2S_5$ were prepared to achieve a molar ratio of $Li_2S:P_2S_5=75:25$. The mixture of these materials was treated with a planetary ball mill (P-7, manufactured by Fritsch, Inc.) for 10 hours at 510 rpm to cause the materials to mechanochemically react. In this way, a glassy solid electrolyte was obtained. The obtained glassy solid electrolyte was heat treated at 270° C. for 2 hours in an inert atmosphere to obtain a glass-ceramic sulfide solid electrolyte. The sulfide solid electrolyte had a composition represented by $Li_2S-P_2S_5$. As used herein, $Li_2S-P_2S_5$ used in the inventive examples and the comparative examples is simply referred to as a "sulfide solid electrolyte".

(Production of Negative Electrode Material)

In a dry argon atmosphere, graphite and the sulfide solid electrolyte were prepared so as to have a mass ratio of 60:40. The materials were mixed in an agate mortar. In this way, negative electrode material was obtained. The negative electrode material was used in the inventive examples 1 to 5.

(Production of Secondary Battery)

(Secondary Batteries of Inventive Examples 1 to 5 and Comparative Examples 1 and 2)

In an insulating cylinder having an inner diameter of 9.5 mm, the sulfide solid electrolyte (40 mg) and the first solid electrolyte material (55 mg) of the inventive example 1 were stacked in this order to obtain a stacking structure. A pressure of 160 MPa was applied to the stacking structure to form a solid electrolyte layer.

Next, the above-described negative electrode material (15.74 mg) was stacked on the layer formed of the sulfide solid electrolyte (of the solid electrolyte layer), and the positive electrode material of the inventive example 1 (in an amount equivalent to 14.17 mg of the positive electrode active material) was stacked on the layer formed of the first solid electrolyte material of the inventive example 1 (of the solid electrolyte layer) to provide a stacking structure. A pressure of 720 MPa was applied to the stacking structure to form a negative electrode and a positive electrode.

A stainless steel current collector was disposed on each of the positive electrode and the negative electrode, and current collecting leads were attached to the current collectors.

Finally, the inside of the insulating cylinder was blocked from the outer atmosphere, by using an insulating ferrule, and sealed. In this way, a secondary battery of the inventive example 1 was obtained.

The same procedure as in the production of the secondary battery of the inventive example 1 was performed to obtain secondary batteries of the inventive examples 2 to 5 and the comparative examples 1 and 2, except that the positive electrode materials of the inventive examples 2 to 5 and the comparative examples 1 and 2 were used in place of the positive electrode material of the inventive example 1.

(Secondary Battery of Inventive Example 6)

In an insulating cylinder having an inner diameter of 9.5 mm, the first solid electrolyte material of the inventive example 6 (80 mg) was placed and a pressure of 80 MPa was applied thereto. Subsequently, after the positive electrode material of the inventive example 6 (in an amount equivalent to 7 mg of the positive electrode active material) was placed in the cylinder, a pressure of 360 MPa was applied to the solid electrolyte material of the inventive example 6 and the positive electrode material of the inventive example 6. In this way, a solid electrolyte layer and a positive electrode were formed.

Next, In metal foil (thickness: 200 μm), Li metal foil (thickness: 300 μm), and In metal foil (thickness: 200 μm) were stacked on the solid electrolyte layer in this order to obtain a stacking structure. A pressure of 80 MPa was applied to the stacking structure to form a negative electrode.

Except for the above matters, the same procedure as in the production of the secondary battery of the inventive example 1 was performed to obtain a secondary battery of the inventive example 6.

(Secondary Batteries of Inventive Examples 7 and 11)

The same procedure as in the production of the secondary battery of the inventive example 6 was performed to obtain a secondary battery of the inventive example 7, except that the positive electrode material of the inventive example 7 (in an amount equivalent to a 7 mg of the positive electrode active material) and the first solid electrolyte material of the inventive example 7 were used in place of the positive electrode material of the inventive example 6 and the first solid electrolyte material of the inventive example 6.

The same procedure as in the production of the secondary battery of the inventive example 7 was performed to obtain a secondary battery of the inventive example 11, except that the positive electrode material of the inventive example 11 was used in place of the positive electrode material of the inventive example 7.

(Secondary Battery of Inventive Example 8)

The same procedure as in the production of the secondary battery of the inventive example 6 was performed to obtain a secondary battery of the inventive example 8, except that the positive electrode material of the inventive example 8 (in an amount equivalent to a 7 mg of the positive electrode active material) and the first solid electrolyte material of the inventive example 8 were used in place of the positive electrode material of the inventive example 6 and the first solid electrolyte material of the inventive example 6.

(Secondary Batteries of Inventive Examples 9 and 10)

In an insulating cylinder having an inner diameter of 9.5 mm, the sulfide solid electrolyte (40 mg) and the first solid electrolyte material of the inventive example 9 (40 mg) were stacked in this order to provide a stacking structure. A pressure of 80 MPa was applied to the provided stacking structure to form a solid electrolyte layer.

Next, the positive electrode material of the inventive example 9 (in an amount equivalent to 7 mg of the positive electrode active material) was stacked on the layer formed of the solid electrolyte layer of the inventive example 9, to provide a stacking structure. A pressure of 360 MPa was applied to the provided stacking structure to form a positive electrode.

Except for the above matters, the same procedure as in the production of the secondary battery of the inventive example 6 was performed to obtain a secondary battery of the inventive example 9.

The same procedure as in the production of the secondary battery of the inventive example 9 was performed to obtain a secondary battery of the inventive example 10, except that the positive electrode material of the inventive example 10 was used in place of the positive electrode material of the inventive example 9.

(Charge-Discharge Test)

(Secondary Batteries of Inventive Examples 1 to 5 and Comparative Examples 1 and 2)

Each obtained secondary battery was disposed in a thermostatic chamber maintained at 25° C.

Each secondary battery was charged until the voltage reached 4.2 V at a current value of 142 µA equivalent to a 0.05 C (20-hour) rate.

Next, each secondary battery was discharged until the voltage reached 2.5 V likewise at a current value of 142 µA equivalent to a 0.05 C rate.

(Secondary Batteries of Inventive Examples 6 to 11)

Each obtained secondary battery was disposed in a thermostatic chamber maintained at 25° C.

Each secondary battery was charged until the voltage reached 3.7 V at a current value of 70 µA equivalent to a 0.05 C (20-hour) rate.

Next, each secondary battery was discharged until the voltage reached 1.9 V likewise at a current value of 70 µA equivalent to a 0.05 C rate.

The measurement results of the discharge capacity of the secondary batteries of the inventive examples 1 to 11 and the comparative examples 1 and 2 are presented in FIG. 1 and Table 1. The expression "volume ratio of active material in positive electrode" in FIG. 1 and Table 1 refers to the ratio of the volume of the positive electrode active material to the sum of the volume of the positive electrode active material and the volume of the solid electrolyte material in the positive electrode.

In FIG. 1, a dotted line is drawn across the plots corresponding to the inventive examples 1 and 5 and the comparative examples 1 and 2.

TABLE 1

| | Positive electrode active material | First solid electrolyte material | Volume ratio of active material in positive electrode | Second solid electrolyte material | Negative electrode active material | Discharge capacity [mAh/g] |
|---|---|---|---|---|---|---|
| Inventive example 1 | NCM | $Li_3YBr_2Cl_4$ | 0.85 | Sulfide solid electrolyte | Graphite | 171.1 |
| Inventive example 2 | NCM | $Li_3YBr_2Cl_4$ | 0.80 | Sulfide solid electrolyte | Graphite | 169.5 |
| Inventive example 3 | NCM | $Li_3YBr_2Cl_4$ | 0.72 | Sulfide solid electrolyte | Graphite | 173.2 |
| Inventive example 4 | NCM | $Li_3YBr_2Cl_4$ | 0.65 | Sulfide solid electrolyte | Graphite | 179.2 |
| Inventive example 5 | NCM | $Li_3YBr_2Cl_4$ | 0.55 | Sulfide solid electrolyte | Graphite | 172.6 |
| Inventive example 6 | NCM | $Li_3YBr_3Cl_3$ | 0.606 | $Li_3YBr_3Cl_3$ | In—Li alloy | 170.3 |
| Inventive example 7 | NCM | $Li_3YCl_6$ | 0.585 | $Li_3YCl_6$ | In—Li alloy | 167.2 |
| Inventive example 8 | NCM | $Li_3YBr_6$ | 0.688 | $Li_3YBr_6$ | In—Li alloy | 178.4 |
| Inventive example 9 | NCM | $Li_{2.5}Zr_{0.5}Y_{0.5}Cl_6$ | 0.65 | Sulfide solid electrolyte | In—Li alloy | 177.6 |
| Inventive example 10 | NCM | $Li_{2.5}Zr_{0.5}Y_{0.5}Cl_6$ | 0.60 | Sulfide solid electrolyte | In—Li alloy | 177.9 |
| Inventive example 11 | NCA | $Li_3YCl_6$ | 0.585 | $Li_3YCl_6$ | In—Li alloy | 173.1 |
| Comparative example 1 | NCM | $Li_3YBr_2Cl_4$ | 0.90 | Sulfide solid electrolyte | Graphite | 130.2 |
| Comparative example 2 | NCM | $Li_3YBr_2Cl_4$ | 0.50 | Sulfide solid electrolyte | Graphite | 102.0 |

DISCUSSION

As evident in Table 1, the batteries containing the positive electrode materials of the inventive examples 1 to 11 have high discharge capacity.

As evident in a comparison of the comparative examples 1 and 2 to the inventive examples 1 to 5, if the ratio of the volume of the positive electrode active material to the sum of the volume of the positive electrode active material and the volume of the solid electrolyte material in the positive electrode is out of the range of not less than 0.55 and not more than 0.85, the discharge capacity of the batteries is largely decreased.

As evident in a comparison of the inventive examples 3 and 4 with the inventive examples 1, 2 and 5, if the ratio of the volume of the positive electrode active material to the sum of the volume of the positive electrode active material and the volume of the solid electrolyte material in the positive electrode is in the range of not less than 0.65 and not more than 0.72, the batteries have higher discharge capacity.

As described above, the positive electrode material according to the present disclosure is suitable for providing a battery having high discharge capacity.

INDUSTRIAL APPLICABILITY

The positive electrode material and the battery according to the present disclosure are to be applied to, for example, all-solid-state lithium ion secondary batteries.

The invention claimed is:

1. A positive electrode material comprising:
a positive electrode active material; and
a first solid electrolyte material, wherein:
the first solid electrolyte material is represented by one of the following chemical formulae:

$$Li_{3-3\delta+a}Y_{1+\delta-a}Me_aCl_{6-x-y}Br_xI_y \quad (A4)$$

where Me represents at least one element selected from the group consisting of Mg, Ca, Sr, Ba, and Zn, and $-1<\delta<2$, $0<a<3$, $0<(3-3\delta+a)$, $0<(1+\delta-a)$, $0\leq x\leq 6$, $0\leq y\leq 6$, and $(x+y)\leq 6$ are satisfied;

$$Li_{3-3\delta}Y_{1+\delta-a}Me_aCl_{6-x-y}Br_xI_y \quad (A5)$$

where Me represents at least one element selected from the group consisting of Al, Sc, Ga, and Bi, and $-1<\delta<1$, $0<a<2$, $0<(1+\delta-a)$, $0\leq x\leq 6$, $0\leq y\leq 6$, and $(x+y)\leq 6$ are satisfied;

$$Li_{3-3\delta-a}Y_{1+\delta-a}Me_aCl_{6-x-y}Br_xI_y \quad (A6)$$

where Me represents at least one element selected from the group consisting of Zr, Hf, and Ti and $-1<\delta<1$, $0<a<1.5$, $0<(3-3\delta-a)$, $0<(1+\delta-a)$, $0\leq x\leq 6$, $0\leq y\leq 6$, and $(x+y)\leq 6$ are satisfied; or $$Li_{3-3\delta-2a}Y_{1+\delta-a}Me_aCl_{6-x-y}Br_xI_y \quad (A7)$$

where Me represents at least one element selected from the group consisting of Ta and Nb, and $-1<\delta<1$, $0<a<1.2$, $0<(3-3\delta-2a)$, $0<(1+\delta-a)$, $0\leq x\leq 6$, $0\leq y\leq 6$, and $(x+y)\leq 6$ are satisfied, and a ratio of a volume of the positive electrode active material to a sum of the volume of the positive electrode active material and a volume of the first solid electrolyte material is not less than 0.55 and not more than 0.85.

2. The positive electrode material according to claim 1, wherein
the ratio is not less than 0.60 and not more than 0.72.

3. The positive electrode material according to claim 2, wherein
the ratio is not less than 0.65 and not more than 0.72.

4. The positive electrode material according to claim 1, wherein
the positive electrode active material is a lithium nickel manganese cobalt oxide.

5. The positive electrode material according to claim 1, wherein
the positive electrode active material is a lithium nickel cobalt aluminum oxide.

6. A battery comprising:
a positive electrode that contains the positive electrode material according to claim 1;
a negative electrode; and
an electrolyte layer that is disposed between the positive electrode and the negative electrode and that contains a second solid electrolyte material.

7. The battery according to claim 6, wherein the second solid electrolyte material is a halide solid electrolyte.

8. The battery according to claim 7, wherein
the second solid electrolyte material is a material that is the same as the first solid electrolyte material.

9. The battery according to claim 6, wherein
the second solid electrolyte material is a sulfide solid electrolyte.

* * * * *